United States Patent [19]

Petrovsky et al.

[11] 4,184,818
[45] Jan. 22, 1980

[54] VALVE FOR PISTON COMPRESSORS AND PUMPS

[75] Inventors: Bogdan S. Petrovsky, Ternopol; Samuil M. Perlin, Moscow; Anatoly A. Okunev, Gorky; Lev I. Nepomnyaschy, Gorky; Nina I. Tepina, Gorky, all of U.S.S.R.

[73] Assignee: Dizelny Zavod "Dvigatel Revoljutsii", Gory, U.S.S.R.

[21] Appl. No.: 858,458

[22] Filed: Dec. 7, 1977

[30] Foreign Application Priority Data

Jun. 17, 1977 [SU] U.S.S.R. .............................. 2489651

[51] Int. Cl.² ........................ F04B 21/02; F04B 39/10
[52] U.S. Cl. ................................ 417/569; 137/512.15; 137/516.13; 137/516.19
[58] Field of Search .............. 417/559, 569, 571, 564; 137/512.1, 512.15, 516.11, 516.13, 516.15, 516.17, 516.19, 516.21

[56] References Cited

U.S. PATENT DOCUMENTS

| | | | |
|---|---|---|---|
| 453,347 | 6/1891 | Remington et al. | 137/516.21 |
| 921,892 | 5/1909 | Rogler | 137/516.13 |
| 955,018 | 4/1910 | Twiggs | 137/516.17 |
| 1,027,587 | 5/1912 | Brenner et al. | 137/516.19 X |
| 3,358,710 | 12/1967 | Page | 137/516.21 X |

FOREIGN PATENT DOCUMENTS

316308 4/1934 Italy ............................. 417/569

Primary Examiner—Carlton R. Croyle
Assistant Examiner—Edward Look
Attorney, Agent, or Firm—Haseltine, Lake & Waters

[57] ABSTRACT

The present invention relates to piston compressors and pumps and more particularly it relates to the valves used in these compressors. The valve according to the invention comprises a seat with gas passages and a plate with a Tee profile in cross section. The vertical element of said profile is located at the side of the seat while the horizontal element has closing portions at the ends, said portions contacting the seat on closing of the valve. This improves the operational reliability of the valve, reduces its gas-dynamic resistance and simplifies the alignment of the valve plate.

3 Claims, 7 Drawing Figures

4,184,818

VALVE FOR PISTON COMPRESSORS AND PUMPS

FIELD OF THE INVENTION

The present invention relates to piston compressors and pumps and more particularly, to the valves for these compressors and pumps.

The piston compressors are widely popular in chemical, gas, petroleum, petrochemical and petroleum refining industries.

They use a considerable proportion of the produced power resources amounting to tens of millions of kilowatts.

BACKGROUND OF THE INVENTION

Among the multitude of designs of the valves used in piston compressors the valves with circular or disc plates are the most common ones.

These types of valves are utilized in the major part of piston compressors, practically in all applications at various pressure differentials for comprising a wide nomenclature of gases including those contaminated.

The valves of piston compressors must meet a number of requirements of which the most crucial ones, bearing an important influence on the efficiency of the piston compressor, are the following:

low resistance of the valve determined by the pressure differential in the valve and, correspondingly, loss of power for overcoming the resistance of the valve by the gas passing therethrough;

high operational reliability.

The need for meeting these requirements is warranted by the fact that various compressors use 1 to 20% of their input power for overcoming the resistance of the valve to say nothing of the undue stoppages and down time of the piston compressors caused by the valves and reaching 20 to 70% of their total values.

In the long run these factors reduce the efficiency of piston compressors due to considerable power losses in the valve for overcoming its resistance, increase the cost of gas production and, in some cases, lead to wastage of the end product owing to disruption of technological processes.

Known in the prior art is a valve (see British Patent No. 1.025.713) comprising a seat with gas passages, at least one plate of a uniform thickness installed movably for closing and opening said seat passages under the effect of the pressure differential acting on the valve, a plate lift limiting stop, at least one spring located between the limiting stop and the plate and intended to move the plate for closing the seat passages at the beginning of valve closing and a device for aligning the plate.

The prior art valve has a number of substantial disadvantages which decrease the operational reliability of the valve, raise its resistance and complicate the alignment of the plate.

These disadvantages are as follows:

high resistances in the middle portion of the plate section as compared with the adjacent portions of said plate section due to the uniformity of the plate cross section in thickness and a maximum bending moment acting on the middle portion of the plate cross section which leads, oarticularly at large pressure differentials acting on the plate, to a reduced contact area of the plate closing portions and, as a consequence, to higher contact stresses at the points of actual contact with the seat;

high contact stresses in the plate at the point of its initial contact with the limiting stop located on the outer contour of the plate, arising due to nonsimultaneous contact of the plate surface with the limiting stop;

high resistance of the valve caused by a sharp turning of the gas flow from the seat passages to the slot created between the seat and the closing portions of the plate on opening of the valve;

complicated device for aligning the plate with the seat passages due to the necessity for making calibrated holes for the pins in the seat or limiting stop and for the use of fitted dowels.

SUMMARY OF THE INVENTION

An object of the invention is to provide a valve of a higher reliability.

Another object of the invention resides in reducing the gas-dynamic resistance of the valve.

Still another object of the invention resides in simplifying the alignment of the plate.

These and other objects are accomplished by providing a valve for piston compressors or pumps comprising a seat with gas passages, at least one plate mounted with a provision for being moved by the difference of pressure in the valve for closing and opening said seat passages, a plate lift limiting stop, at least one spring located between the limiting stop and the plate and intended to move the plate for closing the seat passages at the beginning of valve closing wherein according to the invention the valve plate has a Tee profile in cross section whose vertical element is located at the side of the seat while its horizontal element has closing portions at the ends located at the side of its vertical element, said closing portions contacting the seat on closing of the valve. The Tee profile of the valve plate in cross section makes it possible firstly, by increasing the height of the plate in its middle part, to reduce stresses in this part where said stresses are greatest and, secondly, by increasing the stiffness of the plate, to reduce the contact stresses on the closing portions of the plate at the maximum difference of pressures acting on the plate during its closing. Besides, the horizontal element of the Tee profile of the valve plate has a bevel on the outer contour at the side opposite to the vertical element of said profile, said bevel being directed from the centre of the plate to is periphery.

The initial contact between the plate and the limiting stop on opening of the valve is of an impact nature and the plate moves with a certain cocking. Therefore, the initial contact between the valve plate and the limiting stop takes place not over the entire surface of the plate but in one point only. In addition, the initial contact occurs on the outer contour which causes heavy contact stresses at the moment of initial contact between the plate and the limiting stop. Making the bevel on the outer contour of the plate allows the point of initial contact to be transferred from the edge of the plate outer contour which is a concentrator. The angle of the bevel must be slightly greater than the cocking of the plate and there must be a a smooth transition from said bevel to the horizontal element of the Tee profile at the side opposite to the ventical element of said profile. This will reduce the contact stresses at the point of initial contact between the plate and the limiting stop on opening of the valve. To reduce the gas-dynamic resistance of the valve according to the invention, the vertical element of the Tee profile of the plate has inclined sides which merge gradually into the closing portions of the horizontal element of said profile. This design of the valve plate provides for bringing the flow of gas smoothly, without sharp turns, to the slot formed between the seat and the closing portions of the valve plate on opening of the valve.

To simplify the design of the valve and improve the alignment of its plates, the valve according to the invention has plates with aligning ribs made integral with the plate and adjoining at one side of the vertical element of the Tee profile while at the other side they are limited by the diameter of the gas passage in the valve seat. The ribs are relied upon for aligning the valve plate directly with the cylindrical passages in the valve seat. Such a method of aligning the valve plate directly with the cylindrical passages makes it possible to dispense with the device for aligning the plates.

BRIEF DESCRIPTION OF THE DRAWINGS

Other object and advantages of the invention will become apparent from the detailed description of an example of realization of the valve with reference to the accompanying drawings, in which.

DETAILED DESCRIPTION OF THE INVENTION

Figure 1:
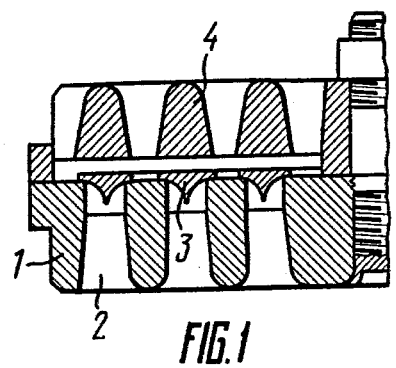
FIG. 1 is a longitudinal section of the valve according to the invention.
Figure 2:
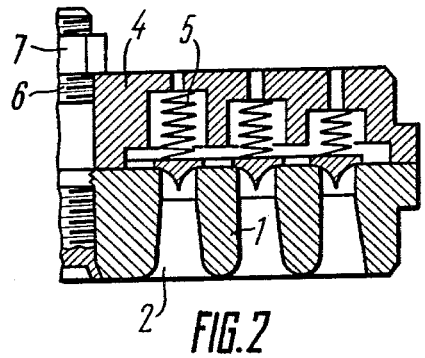
FIG. 2 is a cross section of the valve in the plane of the springs.

The valve according to the invention comprises a seat 1 (FIG. 1) with gas passages 2, a Tee-profiled plate 3 mounted with a provision for being moved by the pressure differential for closing and opening the passages 2, a stop 4 for limiting the lift of the plate 3, and a spring 5 (FIG. 2) located between the stop and the plate and intended to move the plate 3 for closing the passages 2 in the seat 1 at the beginning of valve closing. The seat 1 and the limiting stop 4 are interconnected by means of a stud 6 and a nut 7.

Figure 3:
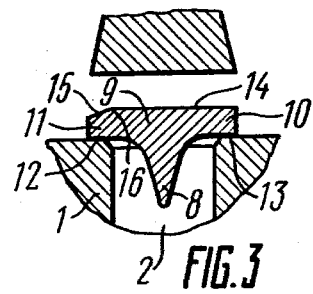
FIG. 3 shows the position of the plate with the valve closed.
Figure 4:
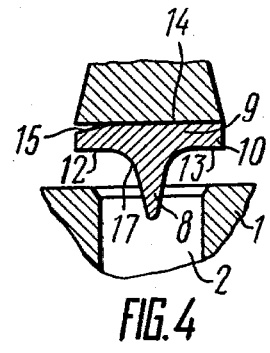
FIG. 4 shows the position of the plate with the valve open.

The plate 3 (FIGS. 3 and 4) has a Tee profile in cross section, the vertical element 8 of said profile being located at the side of the seat 1 whereas its horizontal element 9 has closing portions 12 and 13 at its ends 10 and 11 at the side of the vertical element 8, said closing portions 12 and 13 contacting the seat 1 on closing of the valve.

The horizontal element 9 has a bevel 15 on the outer contour 14 at the side opposite to the vertical element 8, said bevel being directed from the centre of the plate 3 towards its periphery and having a portion 16 gradually merging into the contour 14 of the element 9.

The vertical element 8 of the Tee profile of the plate 3 has inclined sides 17 smoothly merging into the closing portions 12 and 13.

Figures 5, 6, 7:
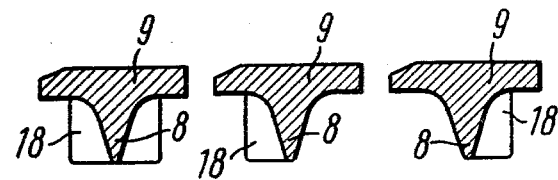
FIGS. 5,6,7 show the versions of aligning ribs on the plate.

The valve plate 3 has at least three aligning ribs 18 spaced around the circumference and made integral with the plate; said ribs adjoin at one side the vertical element 8 of the Tee profile while at the other side they are limited by the diameter of the passage 2 in the seat 1. FIGS. 5,6,7 show some versions of arrangement of these ribs. In FIG. 5 the aligning ribs 18 are made on both sides of the vertical element 8 of the Tee profile of the plate. In FIG. 6 the aligning rib 18 is located between the vertical element 8 of the Tee profile and the outside diameter of the passage 2.

In FIG. 7 the aligning rib 18 is located between the vertical element 8 of the Tee profile of the plate and the inside diameter of the passage 2.

Operating Principle

The valve operates as follows:

when the pressure differential acting from the side of the seat exceeds the resistance of the valve the latter opens, the plate 3 moves all the way to bear against the stop 4 and thus opens the slot for the passage of gas between the seat 1 and the closing portions 12 and 13 of the plate 3;

when there is no pressure difference acting on the valve, the latter is closed and the plate 3 pressed by the closing portions 12 and 13 and the springs 5 fits tightly against the seat 1, closing the seat passages;

when the pressure differential acts on the valve from the side of the limiting stop 4 the valve is closed and the closing force of the springs 5 is increased by the force of the pressure differential acting on the valve.

What is claimed is:

1. A valve for piston compressors and pumps comprising a seat with gas passages; at least one T-shaped circular plate mounted with means for being moved by the pressure differential acting on the valve for closing and opening the passages in said seat and having centering ribs formed as an integral part of the circular plate and adjoining a vertical element of the T-shaped profile of the plate at one side and the other side being limited by the diameter of the passages in the seat for centering the circular plate with respect to those passages; a circular plate lift limiting stop; and at least one spring located between said limiting stop and the plate, said spring ensuring movement of said plate for closing said passages in said seat at the initial moment of valve closing.

2. A valve according to claim 1 wherein the vertical element of the T-shaped profile has inclined sides smoothly merging into the closing portions of said profile.

3. A valve according to claim 1 wherein: the circular plate at the side of the plate lift limiting stop has an inclined surface directed from the center of the circular plate toward its periphery.

* * * * *